United States Patent Office 3,545,232
Patented Dec. 8, 1970

3,545,232
HOOKE'S TYPE UNIVERSAL JOINT
Gerhard Neese, Grossdornberg, and Alfred Witte, Bielefeld, Germany, assignors to Durkoppwerke G.m.b.H., Bielefeld, Germany, a corporation of Germany
Filed Dec. 26, 1968, Ser. No. 787,061
Claims priority, application Germany, Jan. 17, 1968, 1,675,125; Feb. 14, 1968, 1,675,129
Int. Cl. F16d 3/26
U.S. Cl. 64—17                            8 Claims

ABSTRACT OF THE DISCLOSURE

A Hooke's type universal joint in which a pair of yokes lying generally in mutually perpendicular planes are interconnected by cross pins journaled in respective bearings in the lobes of the yoke. The tapered roller bearings surround a frustoconical end of each pin converging outwardly and forming the inner bearing race. The outer bearing race is constituted by a frustoconically drawn self-metal cap fitting over the tapered bearings and held in the respective cylindrical bore or eye of each lobe by a filler body having a frustoconical inner cavity engaging the sheet-metal cap and a cylindrical outer wall anchored to the wall of the bore. The cross-section of the filler body, which may be preformed or constituted of a hardenable material cast in place, tapers from the outer end to the inner end to constitute a wedge taking up all play in the bearing.

---

Our present invention relates to a universal coupling for rotating shafts and, more particularly, to a Hooke's type or cross-joint.

In a Hooke's type universal joint, also known as a cross-linked universal coupling, a pair of yokes are provided on the driving and driven shafts and lie substantially in mutually perpendicular planes while being connected by pins bridging the lobes of each yoke and lying at right angles to one another.

It has already been proposed to provide bearings between these pins and the respective lobes of the yokes to reduce the friction at these regions and, at least in part, take up the axial strain applied to the lobe by the pin whenever the shafts are not precisely in line.

It has been the practice heretofore to provide shoulders or seats within the lobe and to anchor the bearing assemblies with spring rings or the like, or to provide axially effective springs designed to maintain a resilient bias on the bearing. Because of manufacturing tolerances and the complexity of assembly procedures, neither system was effective to allow the widespread use of the system when universal couplings with a minimum of play was desired. In the first case, the elimination of the play normally resulting from manufacturing tolerances requires the selection of a properly dimensioned shim and, generaly, trial-and-error fitting thereof. In the second case, poor results are obtained because the axially effective spring can have only a minimum thickness if reasonably sized joints are to be made.

It is, therefore, the principal object of the present invention to provide an improved Hooke's-type universal joint with a minimum of play between the cross pins and the yokes of the joint.

Another object of this invention is to provide a simplified highly effective bearing assembly from a universal joint of the cross-connected type.

A further object of the invention is the provision of an improved method of making a Hooke's joint or coupling adapted to be used especially in light-load applications, e.g. as a universal joint for a passenger automobile.

These objects and others which will become apparent hereinafter are attained, in accordance with the present invention, in a cross-connected universal joint or coupling having a pair of interfitted yokes, the lobes of which are connected by respective link pins extending at right angles to one another and rotatably mounted in the respective lobes by individual bearings interposed between each end of a pin and the surrounding lobe of the respective yoke.

According to the present invention, the ends of the pins frustoconically converge outwardly such that the conical surface of each end forms the inner race for an array of outwardly tapered roller bearings whose axes converge toward the axis of the pin and which have generatrices along the line of contact between the roller bearings and the frustoconical outer surface of the corresponding pin and which defines a generatrix both of the roller element and of the pin surface.

The outer race of the bearing assembly is formed by an inwardly open pot-shaped cap drawn from hardened sheet metal such that its frustoconical wall, which diverges inwardly toward the open end of the cap, engages the roller elements along contact lines corresponding to generatrices both of the wall of the cap and the roller element.

An essential feature of this invention resides in the provision of a cylindrical bore in the lobe of the yoke in which each bearing assembly is received with all-around clearance, this clearance being taken up by a filler body anchoring the cap axially and radially and securing the cap relative to the pin end such that no play exists in the bearing.

The filler body of the present invention has a cylindrical outer wall in contact with the wall of the bore in the lobe of the yoke and anchored to the latter, preferably at the thick end of the filler body. From this thick end, the cross-section of the filler body tapers down toward in thin end terminating short of the inner end of the sheet-metal cap. At this inner end, the cap is connected with the respective link pin by an annular contaminant-excluding seal which rests against an annular surface of the pin end which is separated from the frustoconical inner race portion by a shoulder or step against which the inner ends of the roller elements are held by the cap.

According to an important feature of this invention, the filler body is a preformed ring which is wedged into the clearance between the frustoconical outer surface of the cap and the cylindrical wall of the bore of the lobe by being driven axially into this clearance from the outside while the caps at the opposite ends of the link pin of each yoke are urged toward one another with a predetermined prestress, whereby the wedge-shaped preformed body anchors the cap in place so that the original play cannot redevelop. When preformed rings are used, it has been found to be desirable to provide anchoring means at the thick end of the ring and the corresponding region of the lobe of the yoke, such anchoring means being an annular groove on one of these members into which an annular projection of the other member is deformed and/or an annular axial flange or collar which is secured to a cylindrical portion of the lobe (e.g. a further collar) by seam or point attachment, such as welding, soldering or adhesive bonding.

Alternatively, the filler body may be cast in place of a hardenable material (e.g. a low-melting metal or a hardenable synthetic resin) which is injected radially into the annual clearance through a bore in which a pillar of the injected material remains to prevent relative movement between the filler body and the lobe.

The above and other objects, features and advantages of the present invention will become more readily apparent from the following description, reference being made to the accompanying drawing in which.

Figure 1:
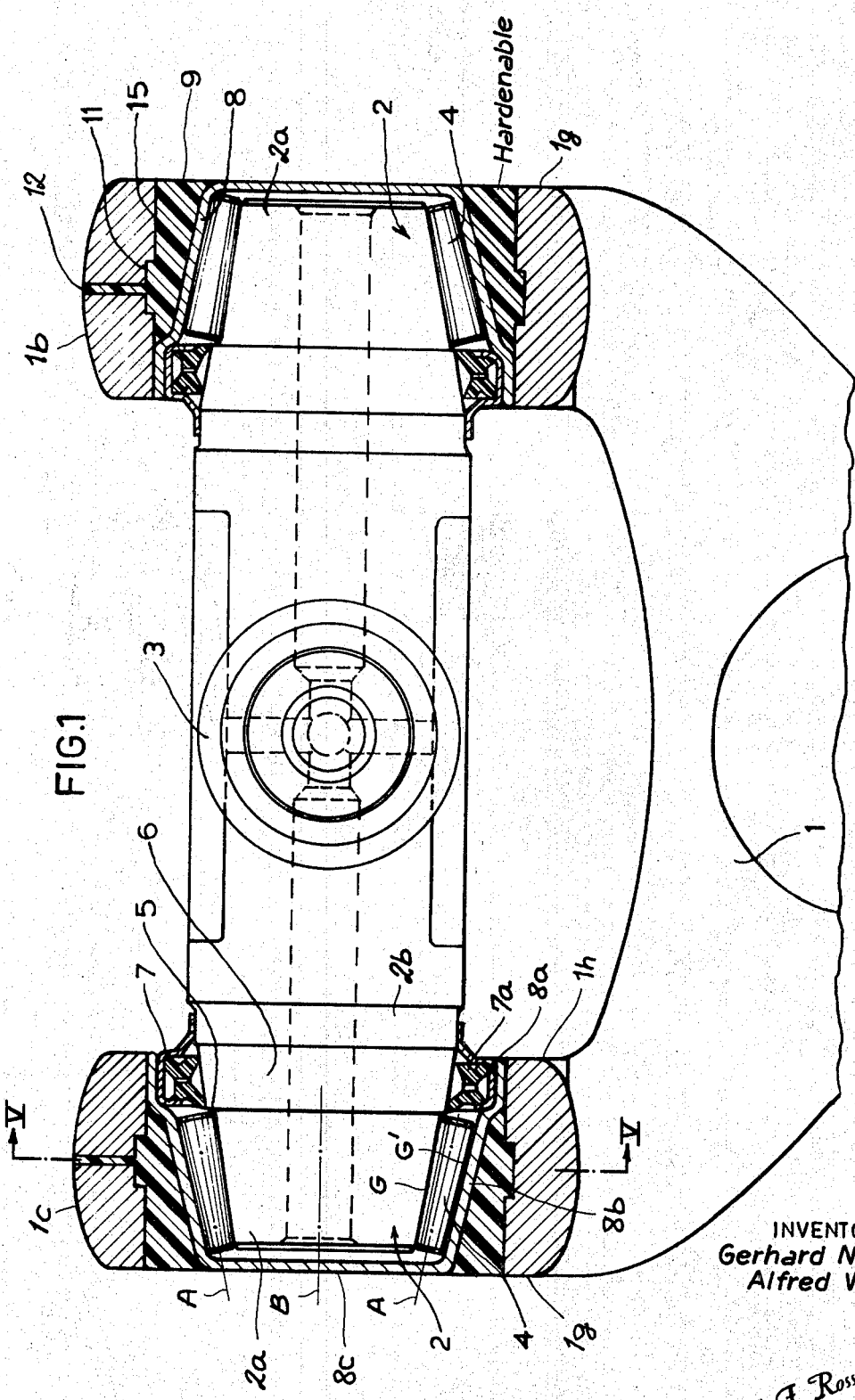
FIG. 1 is an axial cross-sectional view through the lobes of one yoke of a coupling according to the present invention, the other yoke having been removed.
Figure 4:
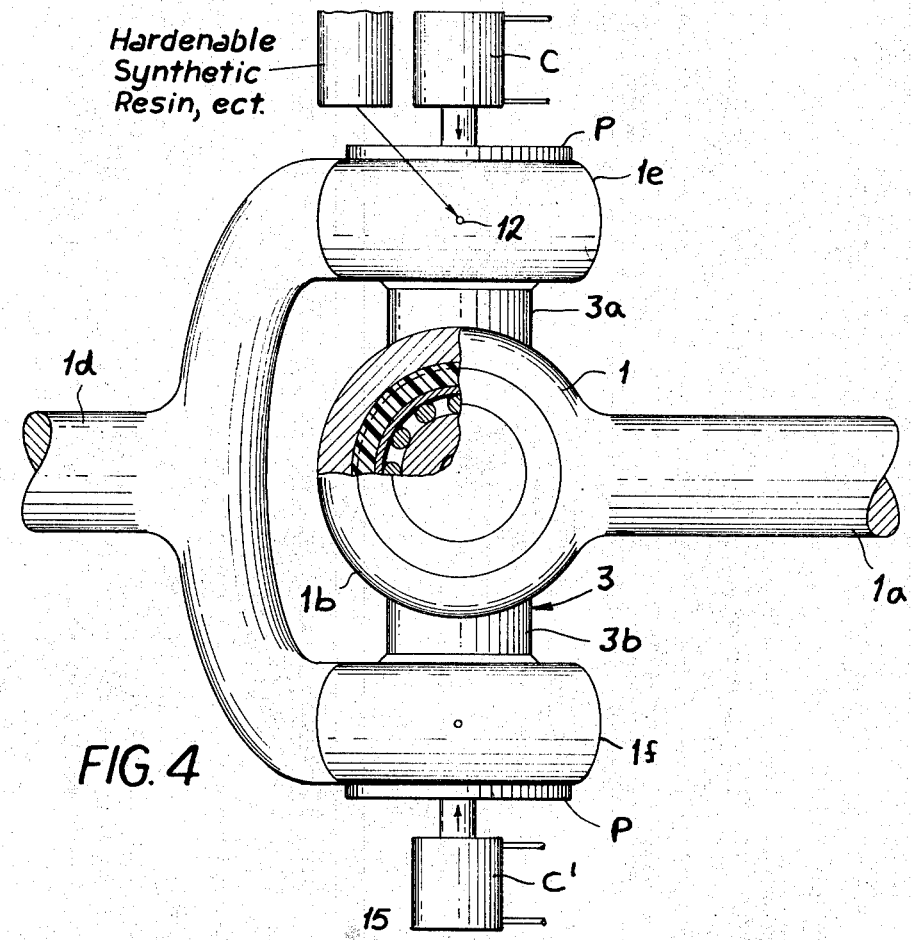
FIG. 4 is a diagrammatic elevational view, partly broken away, showing the universal joint of FIG. 1.
Figure 5:
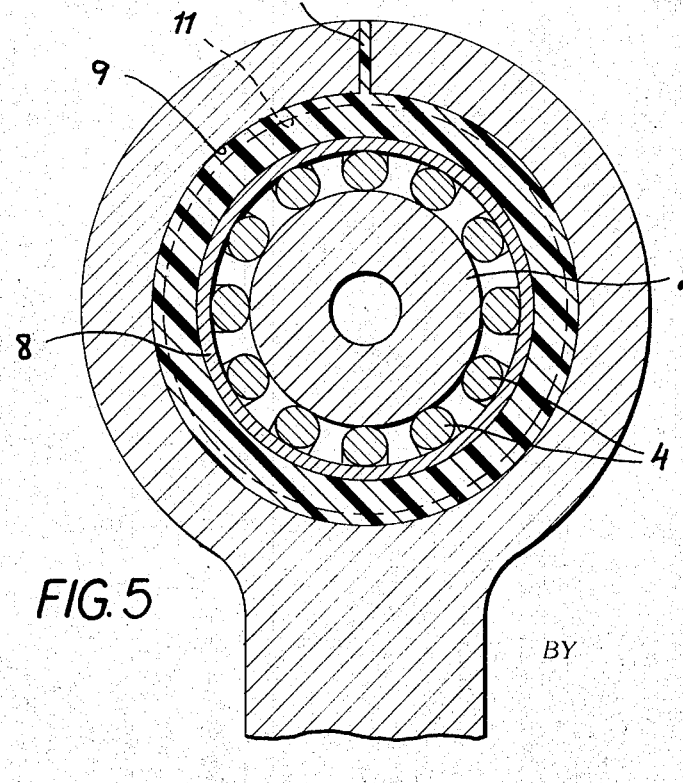
FIG. 5 is a cross-section taken along the line V—V of FIG. 1.

In FIGS. 1, 4 and 5, we show a Hooke's type universal joint, comprising a driving shaft $1a$ provided with a fork-shaped or yoke-shaped head 1 whose lobes $1b$ and $1c$ are shown in axial cross-section in FIG. 1. A cross-pin arrangement 3 is formed with a pair of stub pins 2 which extend into the lobes $1b$ and $1c$ of the coupling and extend at right angles to a further pair of stubs $3a$ and $3b$ which engage the driven shaft $1d$ at its lobes $1e$ and $1f$, respectively. The cross-pin member is represented generally at 3.

As is shown for one yoke in FIG. 1 and is equally true for the other yoke, the stub pins 2 extend into cylindrical bores 9 of the respective lobes and are there formed with frustoconical end portions forming the inner races for a multiplicity of outwardly tapered roller elements 4 whose axes A converge toward the axis B of the respective pin. It will be apparent that each of the roller elements has a generatrix G which, at the line of contact with the frustoconical inner race $2a$, corresponds to a generatrix of this inner race and is also a generatrix of the surface of the roller element. Further, the line of contact G' between each roller element and the frustoconical inner surface of the cap 8 of the assembly is both a generatrix of the roller element and of the outer race.

The inner race is set off by a shoulder 5 at the junction between a frustoconical circumferential portion 6 of each pin 2 and the frustoconical end $2a$ such that the large-diameter bases of the tapered roller elements 4 are seated against this shoulder or surface which lies in a plane perpendicular to the axis B. The circumferential portion 6 also tapers in the direction of the end of the pin and serves as a contact surface for an elastic sealing groove 7 which is received in a metallic sleeve $7a$ fitted as a collar onto the cylindrical step $2b$ of the pin inwardly from the frustoconical portion 6. The sleeve $7a$ and the sealing ring 7 are also received within a cylindrical enlargement $8a$ of the pot-shaped frustoconical cap 8 which is thrust over and sealingly encloses the bearing element 4. The cap 8 has a frustoconical wall $8b$ terminating in the cylindrical enlargement $8a$ at its wide-open end but unitary with a wall $8c$ extending perpendicular to the axis B flush with the outer surface $1g$ of the lobes of the yoke. The enlargement $8a$ lies flush with the inner surface $1h$ of each lobe. The frustoconical cap 8 is drawn from sheet metal and forms along the interior of its frustoconical surface, the outer race of the bearing.

In the annular clearance between the cap 8 and the cylindrical wall of the bore 15 we provide a filler body 9 of a hardenable material, such as a thermosetting synthetic resin or a molten metal having a low melting point (e.g. babbit or white metal) which hardens in place and completely fills the gap. To anchor the filler body 9 to the wall 15, we form the latter with an inwardly open annular recess 11 and with a radial chimney 12 which remain filled with the material of the body 9 and thus prevent axial, angular or radial movement of this body.

Prior to casting of the body in situ, the caps 8 are moved toward one another (e.g. via pneumatic cylinders C and C' in FIG. 4) to the desired degree of prestress, thereby taking up all of the play in the bearing, while the hardenable material is introduced through the chimney 12, the outer end of each lobe being temporarily covered by a plate P. A similar procedure is used for the diametrically opposite bearings of the yoke 1. When the filler body hardens, the prestressing cylinders are relieved and the wedge configuration of the filler body retains the bearing in its playless condition.

The arrangement illustrated in FIGS. 1, 4 and 5 has been found to be particularly advantageous for light-duty universal joints such as those commonly used in passenger vehicles. The bearing, after insertion of the filler body, is found to be free from noncircular irreguarities which have hitherto been common when the cap was stressed and also permits the roller elements to migrate or orbit the pin, thereby limiting the build-up of contaminants, rust or the like. The bearing arrangement can be used with less effectiveness with cylindrical roller bodies in which case it is desirable to provide a roller cage with a consequent reduction in the ability of the bearing to withstand stress.

Figure 2:
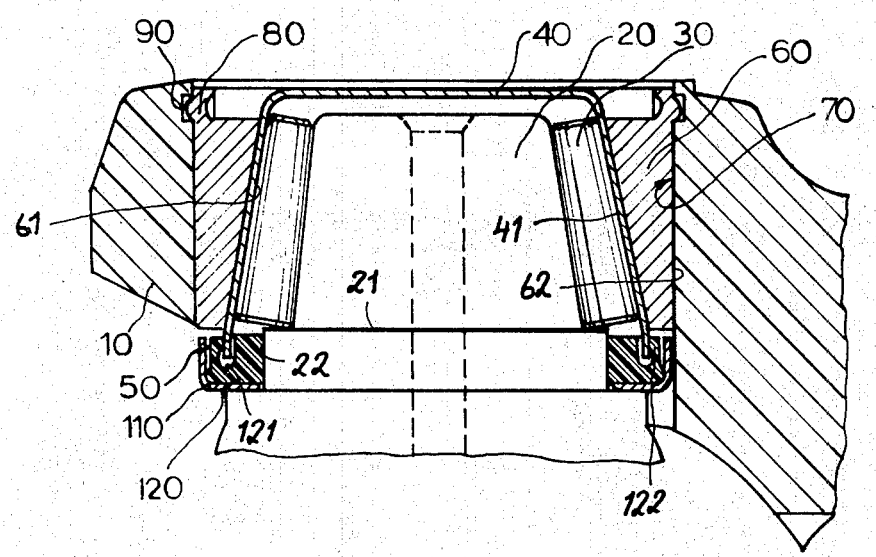
FIG. 2 is a partial cross-section through the lobe of a modified Hooke's-type joint.
Figure 3:
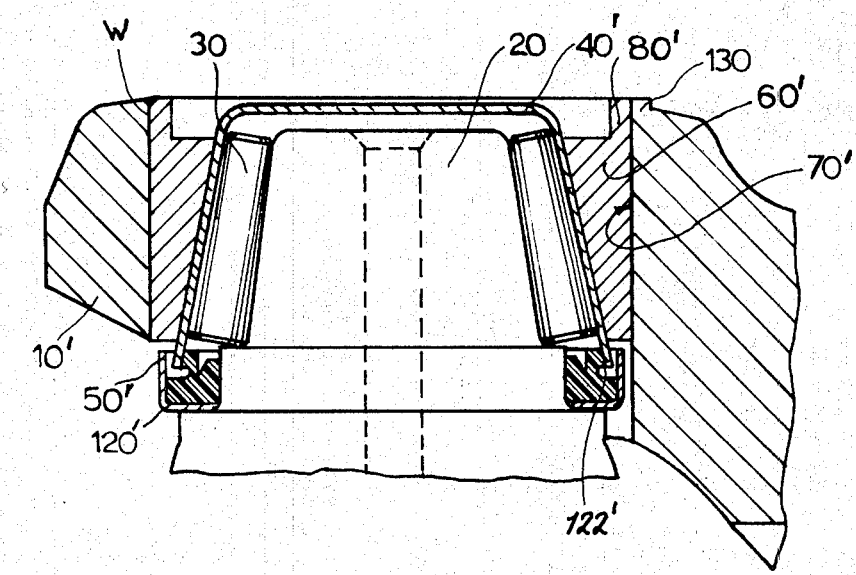
FIG. 3 is a view similar to FIG. 2 of yet another joint according to the instant invention.

For heavy-duty coupling, we prefer to make use of one of the systems shown in FIGS. 2 and 3. From FIG. 2, it will be apparent that each lobe 10 of the yokes is provided with a cylindrical bore 70 receiving the frustoconical end 20 of a cross-pin linkage between the yoke or forks. The tapered roller elements 30 rest against the shoulder 21 and engage the frustoconical portion 20 of the pin as their inner race. The outer race is formed by a pot-shaped cap 40 whose inner end or rim 50 is received within the channel 121 of a rubber-sealing ring 120. The inner periphery of the latter hugs the cylindrical surface 22 adjoining step 21 while the outer periphery of the ring is shielded by a sheet-metal shell 110. The result is a labyrinth-type seal. An inwardly projecting portion 122 of the sealing ring bears upon the outer periphery of the rim 50.

The cap 40 is drawn from sheet metal and hardened. When it is pressed in inwardly, via the filler body 60, it is restored to its original circular cross-section. The preformed metallic filler body 60 has an inwardly narrowing cross-section defined between its frustoconical inner surface 61, which is complementary to and engages the frustoconical wall 41 of the cap, and the cylindrical surface 42 which is snugly received in the cylindrical bore 70. The lobe member 10 and the filler member 60 are provided with mating means for anchoring the wedge-like filler body in place close to the thick end of the latter. This means includes a deformable axially extending flange 80 which has been deformed at spaced locations 81 into the circumferential inwardly open groove 90 at the corresponding collar-like flange of the lobe. The bulge 81 may, of course, extend circumferentially. The sealing assembly 110, 120, etc. has been found to be particularly effective since it compensates for varying axial positions of the cap with respect to the pin.

In the arrangement of FIG. 3, the sealing ring 120' has an outwardly extending projection 122' which sealingly engages the inner surface of the rim 50' of the cap 40'. The lobe 10' is extended via an annular projection 130 around the bore 70' and coaxial with a similar extent 80' of the filler body 60'. The extensions are joined by spot- or seam-type welds, solder or the like.

The improvement described and illustrated is believed to admit of many modifications within the ability of persons skilled in the art, all such modifications being considered within the spirit and scope of the invention except as limited by the appended claims.

We claim:

1. A Hooke's type coupling, comprising a pair of yokes lying in respective planes perpendicular to one another and having respectively pairs of diametrically opposed lobe members each of said lobe members being provided with a respective bore, a cross-pin assembly having a pair of mutually perpendicular pins with respective ends receivable in said bores, respective bearing assemblies surrounding each of said ends and received in said bores with annular clearance for journaling the respective pin ends rotatably with reference to the respective lobe members, and respective annular filler members received in the clearances between each bearing assembly and the wall of the respective bore for maintaining the roundness of the bearing assemblies and taking up play therein, said ends of said pins being of frustoconical configuration and tapering outwardly while forming inner races for the bearing assemblies, each of said assemblies including a plurality of roller elements engaging said inner race and having axes converging in the direction of the axis of the respective pin, and a frustoconical sheet-metal cap surrounding said roller elements and forming the outer race therefor, said cap defining said clearance with said bore, said bore having a cylindrical wall, said filler member having a frustoconical cavity complementary to said cap and engaging same and a cylindrical outer periphery snugly engaging the wall of said bore.

2. The coupling defined in claim 1, further comprising means for anchoring said members together against relative axial, radial and angular movement.

3. The coupling defined in claim 2 wherein the last mentioned means includes at least one recess formed in one of said members and a mating projection on the other of said members received in said recess.

4. The coupling defined in claim 2 wherein said filler member has a cross-section converging axially inwardly with a thicker end and said means is provided at the thicker end of said filler member.

5. The coupling defined in claim 4 wherein said means includes a recess formed in said lobe member and said filler member is provided with an annular cylindrical projection deformable into said recess.

6. The coupling defined in claim 4 wherein said members are provided with corresponding cylindrical axial projections bonded together to secure said filler member in said lobe member.

7. The coupling defined in claim 2 wherein said filler member is cast in situ of a plastic material and is hardened in place.

8. The coupling defined in claim 1 wherein each cap is provided with a rim at its inner end projecting beyond the respective filler member, the coupling further comprising sealing-ring means surounding each of said pin ends and receiving the respective rim with freedom of relative axial displacement of the respective rim and the respective sealing-ring means while lying in all-around contact therewith, each pin end being formed with a shoulder inwardly of said inner race and constituting a seat for said roller elements, and a further annular portion inwardly of said shoulder and hugged by said sealing-ring means said roller elements tapering outwardly.

References Cited

UNITED STATES PATENTS

| | | | |
|---|---|---|---|
| 1,943,814 | 1/1934 | Cutting | 64—17 |
| 3,178,907 | 4/1965 | Lyons | 64—17 |
| 3,216,087 | 11/1965 | Harrington | 64—17X |
| 3,241,336 | 3/1966 | Nemtsov | 64—17 |
| 3,352,127 | 11/1967 | Skinner | 64—17 |

FOREIGN PATENTS

| | | | |
|---|---|---|---|
| 878,997 | 10/1961 | Great Britain | 64—17 |
| 904,170 | 8/1962 | Great Britain | 64—17 |

JAMES A. WONG, Primary Examiner